(12) United States Patent
Brodziak

(10) Patent No.: US 9,169,899 B2
(45) Date of Patent: Oct. 27, 2015

(54) CHAIN CONNECTING ELEMENT WITH SECURITY CROSSPIECE

(71) Applicant: Thiele GmbH & Co. KG, Iserlohn (DE)

(72) Inventor: Eugeniusz Brodziak, Iserlohn (DE)

(73) Assignee: THIELE GMBH & CO. KG, Iserlohn (DE)

( * ) Notice: Subject to any disclaimer, the term of this patent is extended or adjusted under 35 U.S.C. 154(b) by 0 days.

(21) Appl. No.: 14/426,668

(22) PCT Filed: Sep. 11, 2013

(86) PCT No.: PCT/DE2013/100322
§ 371 (c)(1),
(2) Date: Mar. 6, 2015

(87) PCT Pub. No.: WO2014/040589
PCT Pub. Date: Mar. 20, 2014

(65) Prior Publication Data
US 2015/0226287 A1    Aug. 13, 2015

(30) Foreign Application Priority Data
Sep. 11, 2012 (DE) .......................... 20 2012 103 455

(51) Int. Cl.
*F16G 15/04* (2006.01)

(52) U.S. Cl.
CPC ...................................... *F16G 15/04* (2013.01)

(58) Field of Classification Search
CPC .................................. F16G 15/00; F16G 15/04
USPC .......................................................... 59/85
See application file for complete search history.

(56) References Cited

U.S. PATENT DOCUMENTS

| 4,505,103 | A  | * | 3/1985  | Dalferth et al. | 59/85 |
| 6,216,434 | B1 | * | 4/2001  | Dalferth et al. | 59/85 |
| 6,216,435 | B1 | * | 4/2001  | Bogdan et al.   | 59/85 |
| 6,223,517 | B1 | * | 5/2001  | Bogdan et al.   | 59/85 |
| 6,679,648 | B2 | * | 1/2004  | Benecke         | 59/85 |
| 8,056,315 | B2 | * | 11/2011 | Mulle et al.    | 59/85 |
| 2010/0037585 | A1 | | 2/2010 | Mülle et al.   |       |

FOREIGN PATENT DOCUMENTS

| DE | 201224        | 4/1905 |
| DE | 2 055 826     | 5/1972 |
| DE | 90 10 317     | 1/1992 |
| DE | 90 18 107     | 7/1995 |
| DE | 196 52 262    | 6/1998 |
| DE | 202006016032  | 1/2007 |
| WO | WO 00/31438   | 6/2000 |

OTHER PUBLICATIONS

International Search Report issued by the European Patent Office in International Application PCT/DE2013/100322 on Jan. 23, 2014.

\* cited by examiner

*Primary Examiner* — David B Jones
(74) *Attorney, Agent, or Firm* — Henry M. Feiereisen LLC

(57) ABSTRACT

A chain connecting element has two link brackets, coupled via their limbs, and a crosspiece inserted transversally between the limbs. A limb of each link bracket has a neck section and a journal, a neck recess and a journal recess being provided on the opposite limb. The crosspiece includes a bolt, a sleeve and a spring journal. The crosspiece is a mirror-symmetrical design with an outer-lying bearing sleeve on each side of the crosspiece for form-locked locking engagement in the link brackets. The inner-lying bolt has a spring journal on each of its ends, wherein a clamping pin is insertable or extractable on both sides of the locking bolts and secures each of the spring journals in a respective bearing sleeve in form-locked manner.

10 Claims, 15 Drawing Sheets

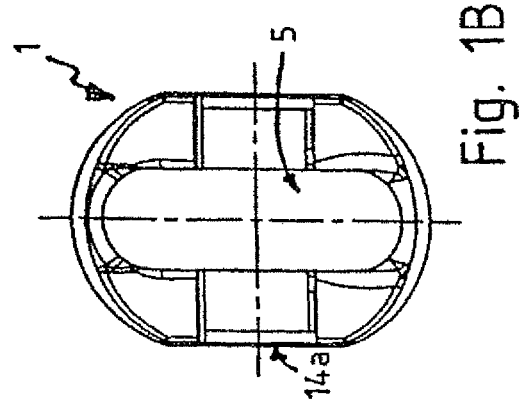
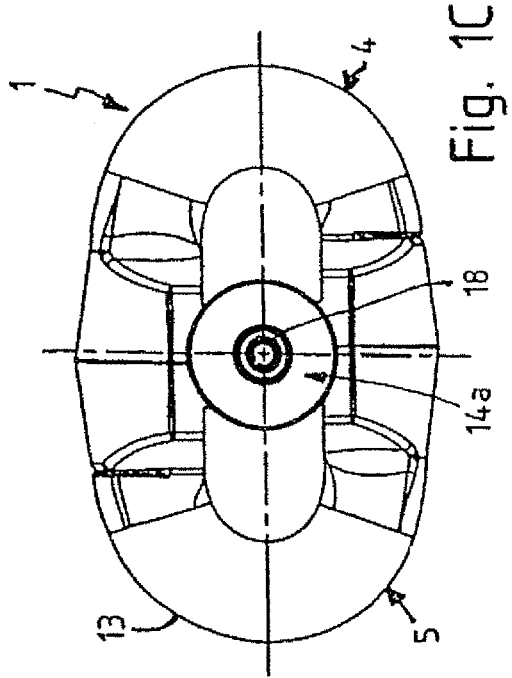

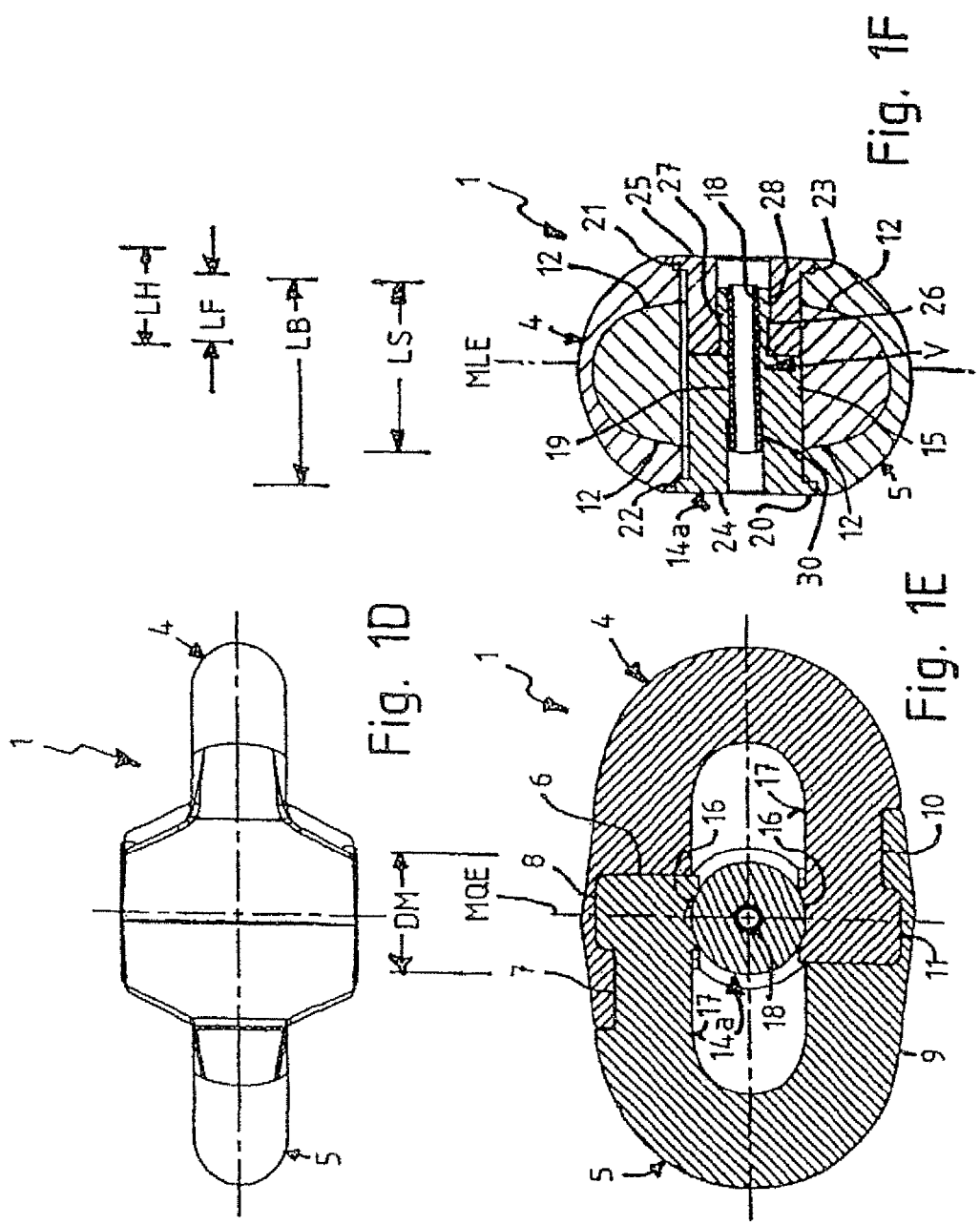

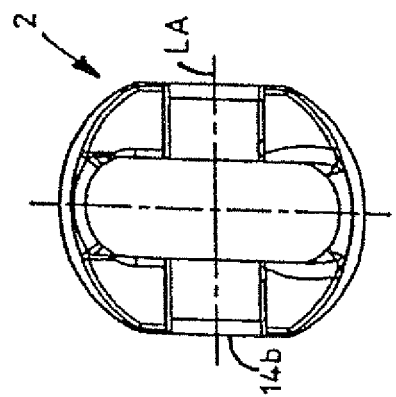
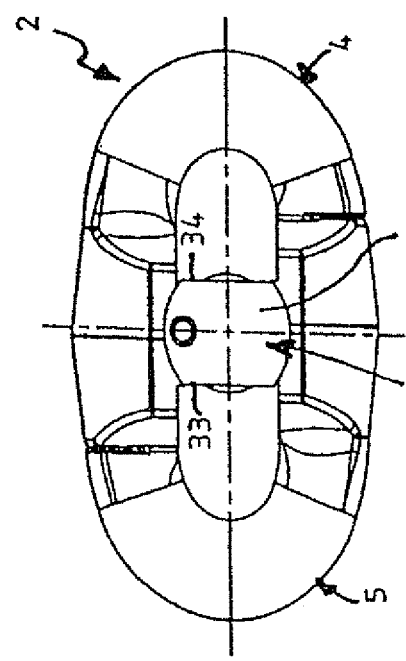
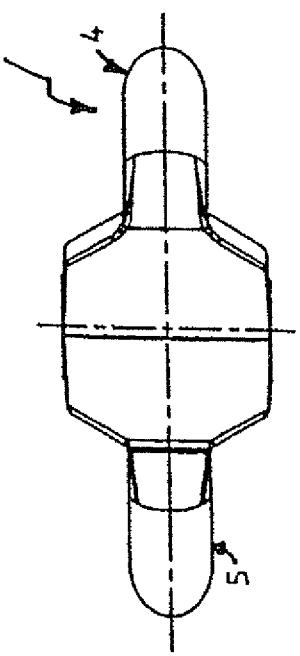

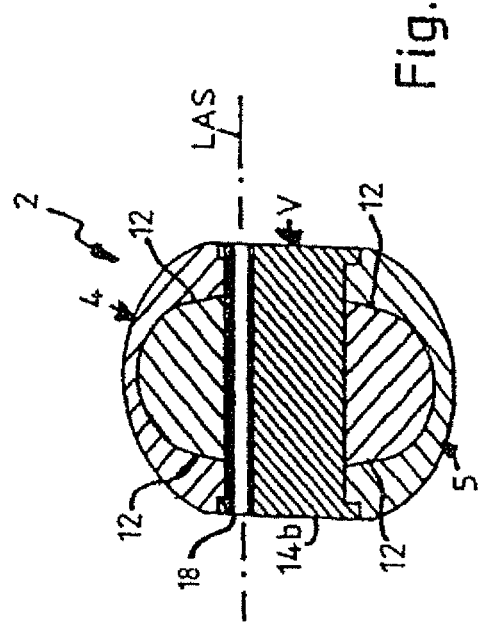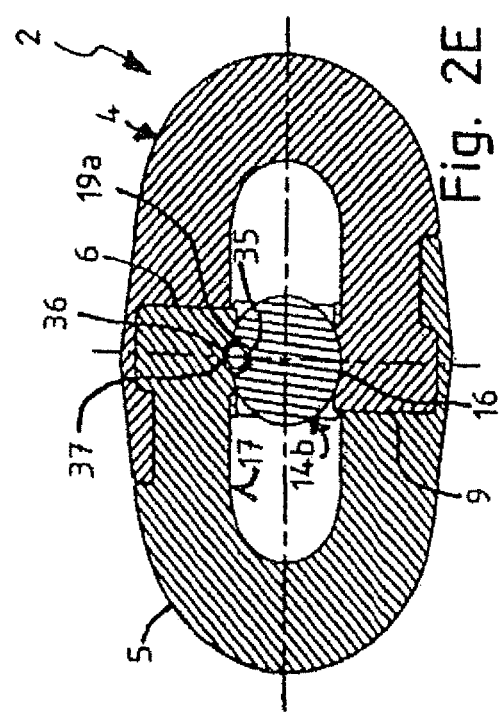

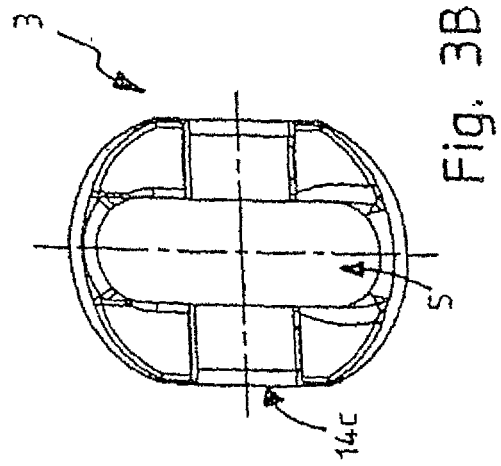
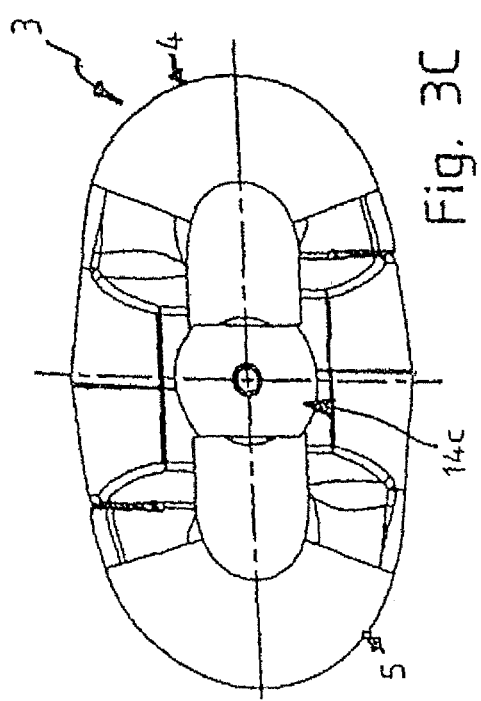
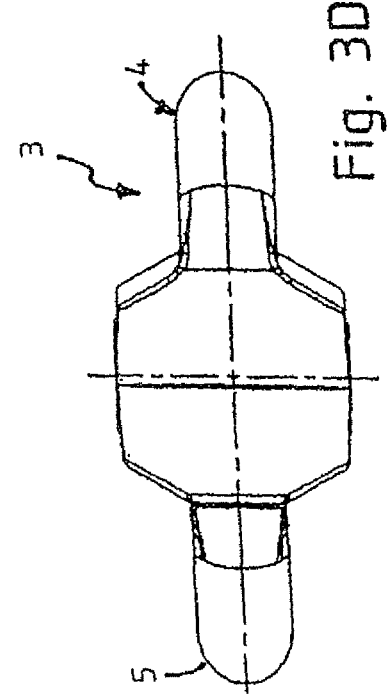

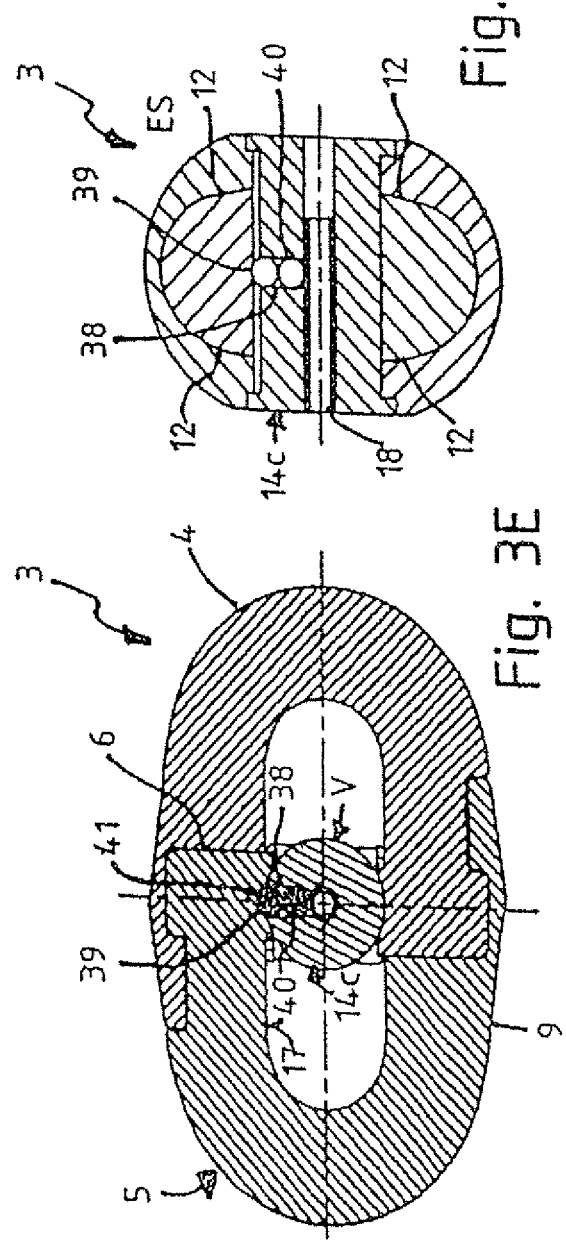

a)

b)

a)

b)

a)

b)

CHAIN CONNECTING ELEMENT WITH SECURITY CROSSPIECE

CROSS-REFERENCES TO RELATED APPLICATIONS

This application is the U.S. National Stage of International Application No. PCT/DE2013/100322, filed Sep. 11, 2013, which designated the United States and has been published as International Publication No. WO 2014/040589 and which claims the priority of German Patent Application, Serial No. 20 2012 103 455.7, filed Sep. 11, 2012, pursuant to 35 U.S.C. 119(a)-(d) the description of which is hereby incorporated by reference.

BACKGROUND OF THE INVENTION

The present invention refers to a chain connecting element.

Chain connecting members find especially application in high-performance round link steel chains as utilized in underground mining. It is known that when using chain connecting links in the Kenter-mode of construction, after use, the disassembly can prove difficult, since the long clamping pin can seize due to rust in the obliquely extending bore which extends through the opposing limbs of the two link halves and the crosspiece. In addition, the clamping pin as well as the crosspiece disposed between the two link halves are exposed to shearing stress as a result of stress to which the two link halves of the chain connecting link are subjected, so that the extraction of the clamping pin from the long bore is further complicated. Furthermore, the extraction of the clamping pin requires a long spike which, during extraction process, is subjected to intense bending stress which it can resist to an only a limited extent.

The Kenter lock known from DE-PS 201 224 has been refined in most varying embodiments. The refinement according to DE 90 10 317 U proposes a chain connecting link especially for high-performance-round steel chains which use a locking ball as locking element which can be fixed in position by a clamping pin lodged obliquely relative to the chain link plane. A relatively short clamping pin can be used which, should it seize due to rust within the bore of the crosspiece, can be easily extracted from the crosspiece to the other side with a short, respectively rigid spike. This simplifies the assembly as well as the disassembly. A disadvantage is however the increased production costs and the fact that the locking ball represents an additional component, thus increasing the number of parts. This disadvantage is also true for the chain connecting link disclosed in DE 196 52 262 C2 which uses, instead of the locking ball, separate locking elements that are connected with each other by a pivot bolt which extends through the crosspiece component. Pivoting by 90° causes locking elements to embrace guide surfaces on the limbs of the link bracket so that the crosspiece component is secured from falling out from the chain connecting link. The fixed positioning of the ring element is realized by a safety pin driven in parallel to the pivot axis.

Furthermore, DE 20 2006 016 032 U1 discloses a chain connecting link in which two link brackets coupled via their limbs are locked by a crosspiece inserted transversely between the limbs of the link brackets. Depending on a dimensioning of the chain, the latter as well as the link brackets can have a weight of several dozens of kilograms of weight so that during both assembly of the chain connecting and disassembly of the chain connecting link, the entire chain extending from both sides of the chain connecting link must be lifted and turned to enable extraction of the crosspiece.

SUMMARY OF THE INVENTION

Object of the present invention is thus to provide a chain connecting link that is easier to lock and unlock compared to the chain connecting links known in the art.

The afore-stated object is solved by a chain connecting element according to the present invention, which includes two link brackets connectable via their limbs and having a crosspiece insertable transversely between the limbs, wherein a limb of each link bracket includes a neck portion and in relation thereto a thickened journal and the opposing other limb has a complementing neck recess and a journal recess, wherein the two interconnected link brackets are lockable by the crosspiece and the crosspiece is formed by a bolt, a sleeve and spring journal, wherein the crosspiece is constructed mirror-symmetrical, wherein at each side an outer bearing sleeve realizes a form-fitting locking engagement in the link brackets and an inner locking bolt is provided on each of its ends with a spring journal, wherein a clamping pin is insertable or extractable from both sides into the locking bolt and form-fittingly secures the spring journals in each bearing sleeve.

Advantageous variants of the present invention are subject matter of the dependent claims.

The chain connecting element according to the invention includes two link brackets capable of being coupled via their limbs, and a which can be inserted transversely between the limbs. A limb of each link bracket includes, in turn, a neck portion and a thickened journal in relation thereto, wherein the respectively oppositely located limb has a complementary neck recess and journal recess. The two interconnected link brackets are lockable via the crosspiece, with the crosspiece being formed with a sleeve, a bolt and a spring journal. The chain connecting element is characterized in accordance with the invention in that the crosspiece is constructed mirror-symmetrical, wherein at each side an outer bearing sleeve is provided for form-fitting locking engagement in the link brackets and that an inner locking bolt has at each of its ends a spring journal, with a clamping pin being insertable or extractable from both sides into the locking bolt, and with each of the spring journals being form-fittingly secured in place in a bearing sleeve.

Through the construction of the crosspiece according to the invention, it is thus possible to lock and also to unlock the chain connecting element from both sides, regardless of its installation site or also its installation position. Especially after use, the clamping pin is partially blocked in its movement within the locking bolt, due to penetration of dust and contaminations, so that the clamping pin can be extracted from the locking bolt only by a punch. Subsequently, the locking bolt itself is also extracted from the bearing sleeves by a greater punch. This can be executed in accordance with the invention regardless of the side of the chain connecting element. In most cases, one side of the chain connecting element is always easily accessible by an operator so that the operator can extract the respective components on the opposite side to thereby loosen the chain connecting element. An elaborate turning of the chain is thus not required.

Depending on installation position and utilization of the chain, it is conceivable that the chain is under such stress that a chain connecting element locked by locking means known in the art cannot be rotated or only to a limited extent rotated, so that under certain circumstances, it was encountered that the locking means, especially a crosspiece, could not be extracted from the connecting element and the connecting element had to be destroyed for example by opening it through outward deflection. This is avoided by the possibility to extract the locking means or also first to insert it from either side.

It is further preferred to provide the bearing sleeves on an outer end with a chamfered shoulder which projects out in relation to an outer surface area, with the chamfered shoulder resting on the link brackets in a form-fitting manner. In utilizing the bearing sleeves according to the invention, the link brackets are thus form-fittingly embraced and locked by the chamfered shoulder at the respective side. An axial clearance in direction of the locking bolt is thus prevented. It is especially preferred when the chamfered shoulder is received in a recess of the link brackets, so that an outer side of the chamfered shoulder ends flush with the outer side of the link brackets. As a result, there is no damage to the locking means in the form of the crosspiece, and to an interlocking or catch of the link bracket during passage of deflection rollers, gears, or also slide rails.

To improve insertability into the two interconnected link brackets, each of the bearing sleeves is flattened at an inner side of its outer surface area. This facilitates at first the insertion of the bearing sleeve into the link brackets and the further insertion or driving-in.

In docked state, the inner sides of both bearing sleeves abut end-to-end in a form-fitting manner. On the one hand, locking of the link brackets by the two bearing sleeves substantially through the cross section of the entire chain connecting element is hereby rendered possible; on the other hand an axial clearance in combination with the terminal chamfered shoulder is prevented. The chain connecting element and especially the crosspiece, used to effect locking, can thus not be knocked out or even loosened, even at intensive and long term use.

To enable especially the mirror-symmetric insertion of the crosspiece according to the present invention, used to effect locking, the locking bolt has a centrally disposed centering cylinder, with spring journals respectively projecting out from the centering cylinder and formed in one piece and with same material therewith. This enables to first assemble the locking bolt with a bearing sleeve and thereafter to insert the bearing sleeve together with the locking bolt into the two interconnected link brackets and to lock it with the further bearing sleeve. Alternatively, it is possible to first insert a bearing sleeve, which is then fully locked via the crosspiece, when the second bearing sleeve with the locking bolt is inserted. . . . As soon as the respective spring journals abut the bearing sleeves in a form-fitting manner, a preliminary safeguard, especially assembly security, is established so that a bearing sleeve, after complete insertion of the crosspiece to effect locking, cannot inadvertently fall out from the link brackets.

During the actual use of the chain connecting element, the chain connecting element and thus also, at least in part, the crosspiece, is subjected to pulling forces of up to several hundred and even thousand Newtons, wherein the crosspiece may tilt. The locking bolt is hollow, with a clamping pin being insertable into or also extractable from the locking bolt at both sides. The clamping pin is selectively insertable from each side.

Within the scope of the invention, a two-part clamping pin can also be used, with a clamping pin being inserted from each side, or alternatively, first the locking bolt is connected together with a bearing sleeve and securely locked via a clamping pin half. Thereafter, the second clamping pin is inserted, after placement of the second bearing sleeve for locking the two link brackets to each other.

It is further preferred to provide each spring journal with at least two spring tongues, with a detent nose being formed at the ends of the spring tongues. The individual spring tongues are configured for mobility relative to each other via a separation slit such that insertion into a bearing sleeve is rendered possible and the detent noses lock or snap-in, when the desired locking position is attained. Subsequent driving of the clamping pin produces in combination with the detent nose such a formfit that an inadvertent or spontaneous loosening is not possible.

For a simplified insertion, the detent noses are flattened at an outer side, wherein an insertion opening of the bearing sleeve is configured with an enlarged diameter. In addition, the spring tongues in turn are provided with an inner diameter which increases toward the end of the spring tongues for a simplified insertion of the clamping pin. Thus, on the one hand it is easier to place and to drive-in the clamping pin itself, and when extracting the clamping pin, it is easier for a puncher to place the punch into the opening as a result of the increased inner diameter toward the end.

Within the scope of the present invention, the chain connecting element is in particular formed from a metallic material. The crosspiece and all the afore-described components of the crosspiece are also formed from a metallic material. In particular, a steel material is being utilized. Spring steel in particular is utilized for the locking bolt, but also for the clamping pin. The individual components can be at least partially quenched and tempered, in particular hardened and/or forged.

BRIEF DESCRIPTION OF THE DRAWINGS

Further advantages, features, properties and aspects of the present invention are subject matter of the following description. Preferred embodiments are shown in the schematic figures. These serve for ease of understanding of the invention. It is shown in.

DETAILED DESCRIPTION OF PREFERRED EMBODIMENTS

Figure 1A:
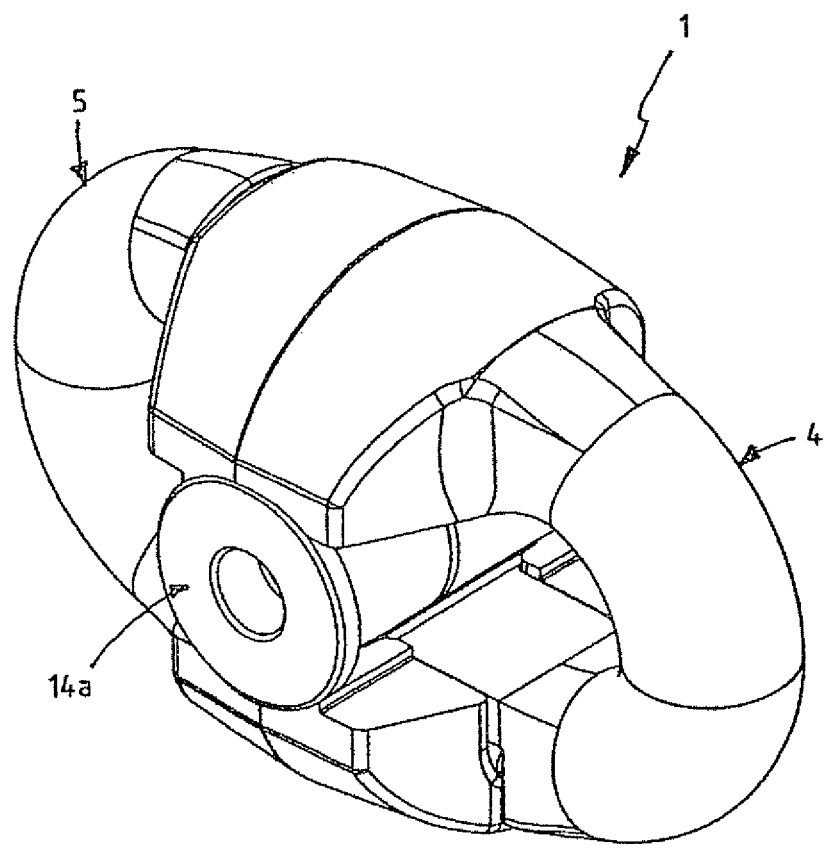
FIG. 1 a chain connecting element known in the prior art.
Figure 2A:
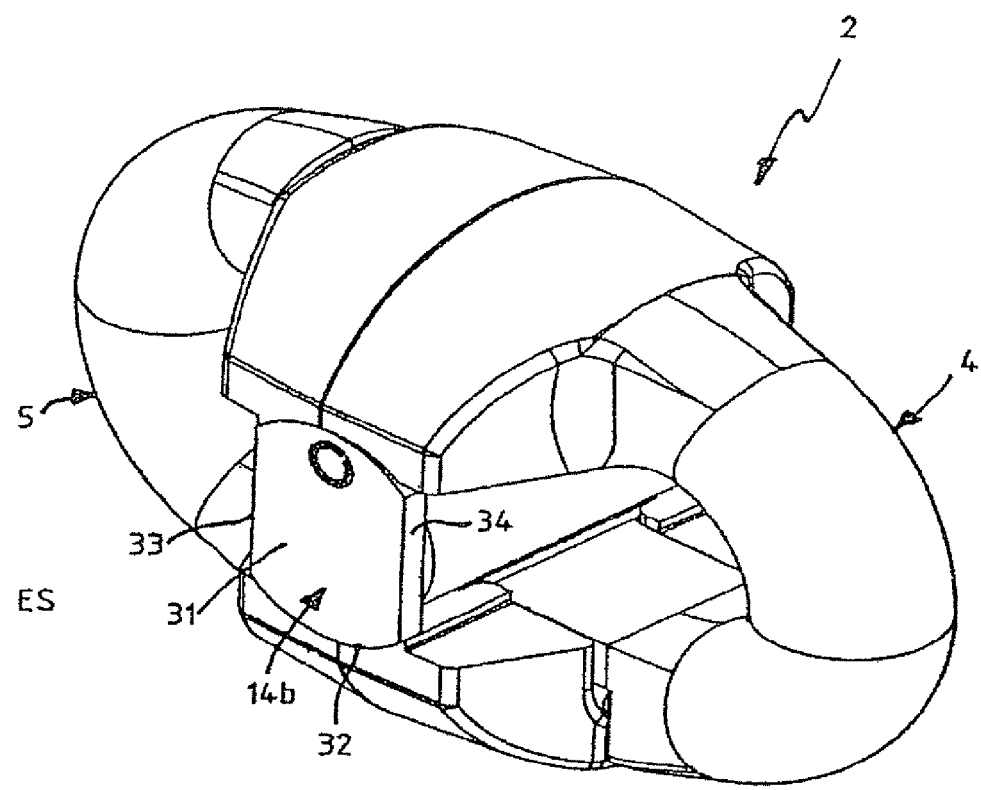
FIG. 2 a chain connecting element known in the prior art.

In the Figures, the same reference numerals are used for same or similar parts, even if a repeated description is omitted for the sake of simplicity.

Each of the chain connecting members 1-3 of FIGS. 1a to 3f has two same link brackets 4, 5 which are coupled via their limbs and configured identical in all Figures. A limb 6 of each of the link brackets 4, 5 has a neck portion 7 and a thickened journal 8 in relation thereto. The other limb 9 of the link bracket 4, 5 is provided with a corresponding neck recess 10 and a journal recess 11 is provided. According to the invention, each journal 8 and journal recess 11 is provided with conical flank surfaces 12 with respect to the vertical longitudinal center plane MLE of the journals 8 (cf. also FIG. 4 and FIG. 5). This length L of the limbs 6 is furthermore so dimensioned that the transverse center plane MQE of the chain connecting link 1-3 intersects the journals 8.

The link brackets 4, 5 are made from a suitable steel material through forging and include in bracket portion 13 an oval to circular cross section. In known manner, the link brackets 4, 5 can be mutually threaded into end links, not shown here in greater detail, of two chain strands.

The link brackets 4, 5 are coupled by inserting them into one another and then locking them by a crosspiece 14a-14c which is inserted transversely between the two limbs 6, 9 of the link brackets 4, 5. The crosspiece 14a-14c includes a cylindrical center portion 15 having a diameter DM which is conformed to guide grooves 16 in the inner sides 17 of the limbs 6, 9. The crosspiece 14a-14c is secured by a safety pin 18 which is insertable into a bore 19, 19a in or at the crosspiece 14-14c. The length LS of safety pin 18 is shorter than the length LB of the bore 19, 19a. At the end, the crosspiece 14a-14c has axial extension safeguards 20, 21 which extend beyond the diameter DM of the central portion 15 and rest in formfitting manner in recesses 22, 23 at each of the limbs 6, 9 of the link brackets 4, 5. FIGS. 1a to 1f to FIGS. 3a to 3f illustrate three embodiments of the crosspiece 14a-14c, with the differences being described hereinafter.

In the embodiment of FIGS. 1a to 1f, the crosspiece is formed by a bolt 24 and a bearing sleeve 25, with the sleeve 25 being formfittingly attached to an axial spring journal 26 of the bolt 24. The spring journal 26 is longitudinally slit and includes a circumferential step 27 which engages in a collared step 28 provided in a bore 29 of the sleeve 25. The length LF of spring journal 26 is shorter than the length LH of the sleeve 25, and the safety pin 18 is driven into the axial bore 19 of the bolt 24. The axial bore 19 of the bolt 24 has a shoulder 30 so that the safety pin is easier to drive-in and to knock out.

The crosspiece 14b, 14c of the embodiments of FIGS. 2a to 2f and FIGS. 3a to 3f is configured in one piece. At one end 31 the axial removal safeguard 32 is flattened on two parallel sides 33, 34. In this manner, the crosspiece 14a, 14c can be shifted from a starting position, not shown in greater detail, to an engagement position ES, when being turned by 90° about the longitudinal axis LA. In the engagement position ES, the crosspiece 14b, 14c can be secured in the engagement position ES by the safety pin 18 that blocks the turning motion of the crosspiece 14b, 14c relative to the limbs 6, 9.

In the embodiment of FIGS. 2a to 2f, the safety pin 18 rests at the crosspiece 14b with a first sub-circumferential area 35 and with a second sub-circumferential area 36 in a depression 37 at the inner side 17 of the limbs 6, 9. The longitudinal axis LAS of safety pin 18 extends thereby parallel to longitudinal LA of the guide grooves 16.

Figure 3A:
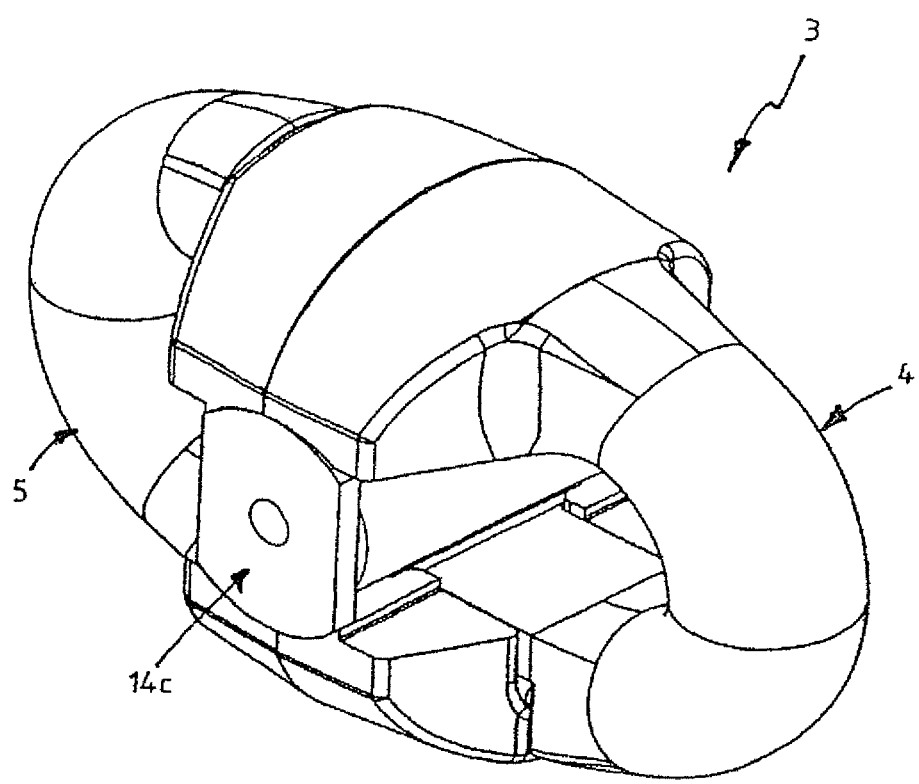
FIG. 3 a chain connecting element known in the prior art.
Figure 4:
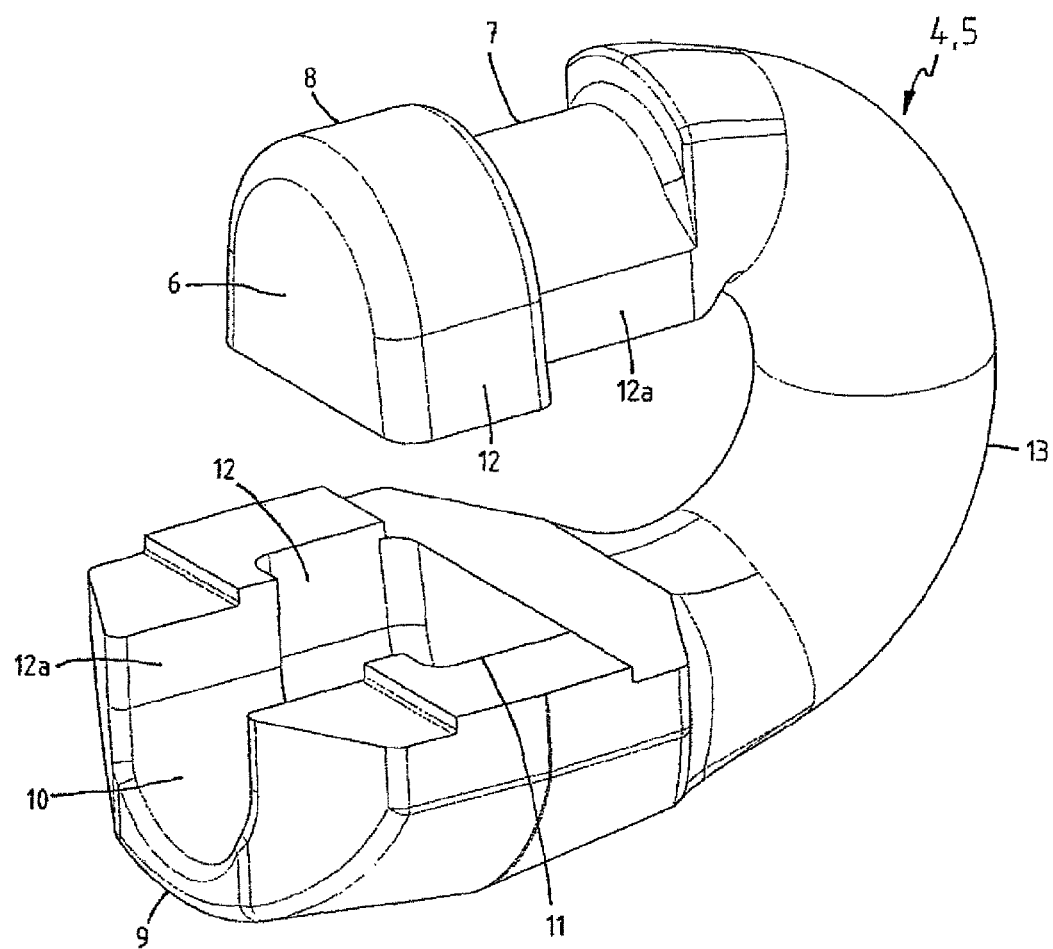
FIG. 4 a chain connecting element known in the prior art.

In the embodiment of FIGS. 3a to 3f, the crosspiece 14c has a central transverse bore 38. Arranged in the transverse bore 38 are at least two locking bodies 39, 40 which are in contact with one another. As can be seen in FIGS. 3e and f, the locking bodies 39, 40 involve steel balls. The locking bodies 39, 40 can be shifted by the safety pin 18 into an engagement position ES. One locking body 39 bears in the engagement position ES in the depression 41 at the inner side 17 of a limb 6.

Figure 5:
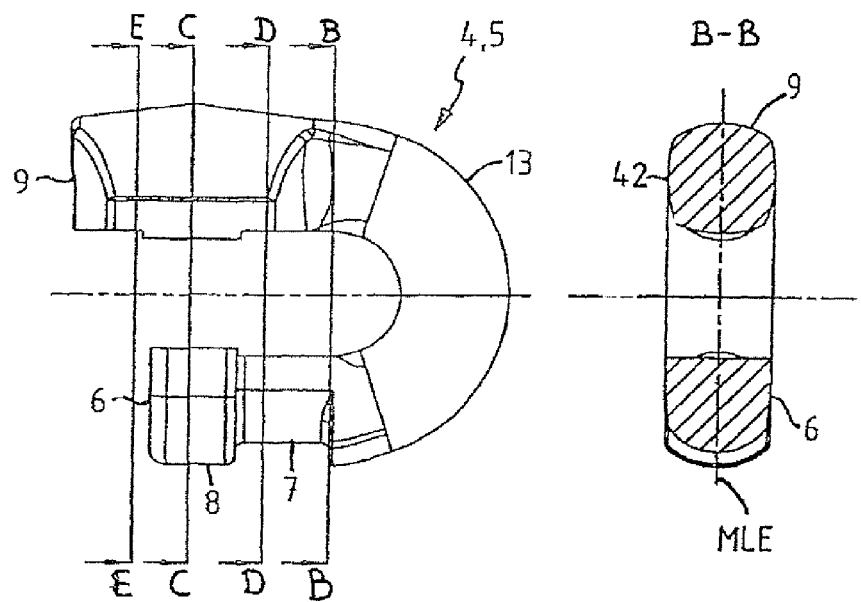
FIG. 5 a chain connecting element known in the prior art.
Figure 5:
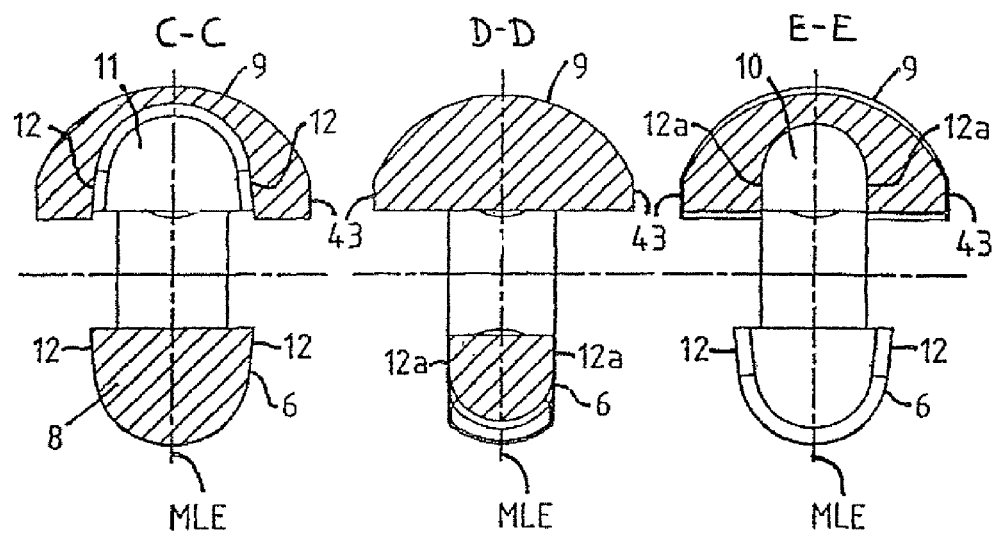

In FIG. 5, the link bracket 4, 5 are shown by way of a side view. To the right thereof, four cross sectional illustrations are shown which extend along the lines B-B, C-C, D-D and E-E in the side view. It is shown in section B-B that the limb 9 has in this section a substantially square cross section with outwardly arched side surfaces 42. In section C-C, the journal 8 and the journal recess 11 can be seen. The flank surfaces 12 of the journal 8 and the journal recess 11 are configured in conical shape with respect to the vertical longitudinal center axis MLE of the journal 8. The limb 9 is greatly widened in the area of journal recess 11 and includes parallel side surfaces 43. It is apparent in section D-D that flank surfaces 12a are configured in parallel relation to the vertical longitudinal center axis MLE of the journal 8 in the area of neck 7. The same is true for the likewise parallel flank surfaces 12a of the neck recess 10, which is illustrated in section E-E.

Figure 6:
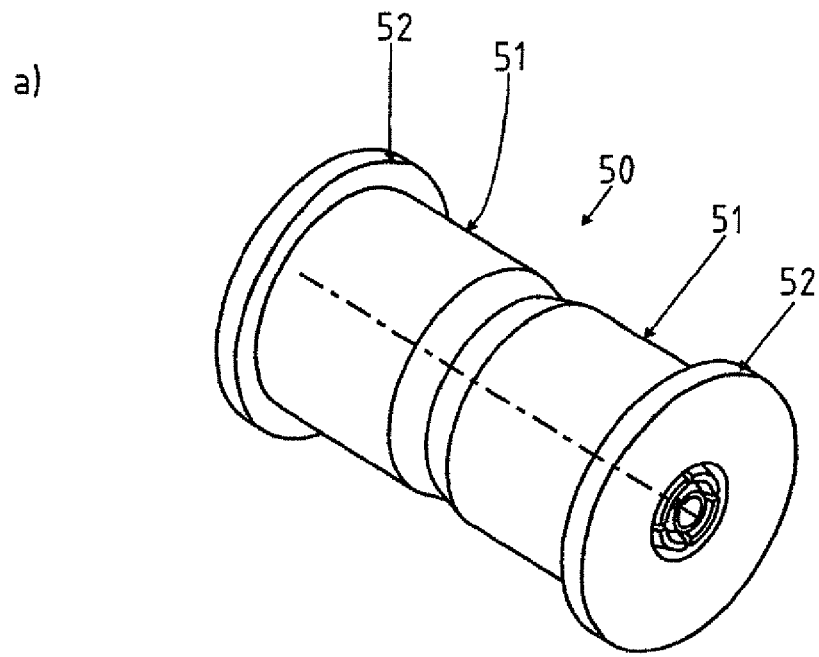
FIGS. 6a, b a crosspiece according to the invention by way of a perspective view and a section view.
Figure 6:
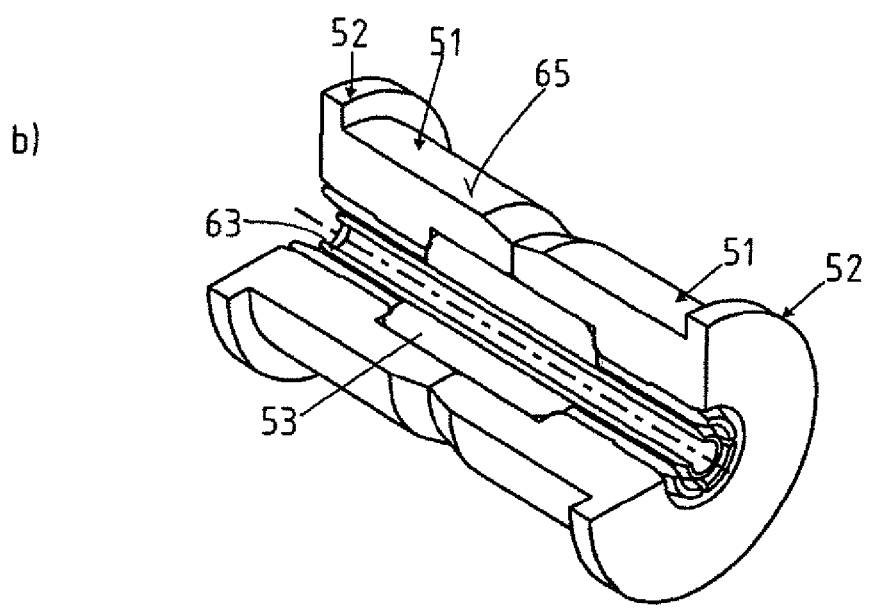
Figure 9:
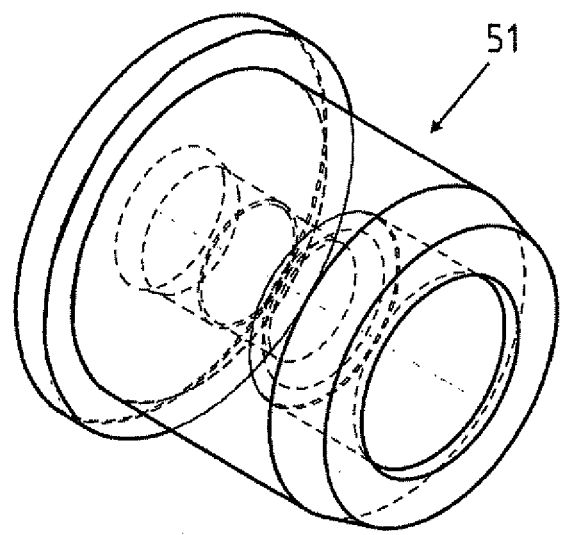
FIGS. 9a, b a bearing sleeve according to the invention and a locking bolt according to the invention, each by way of a perspective view.
Figure 9:
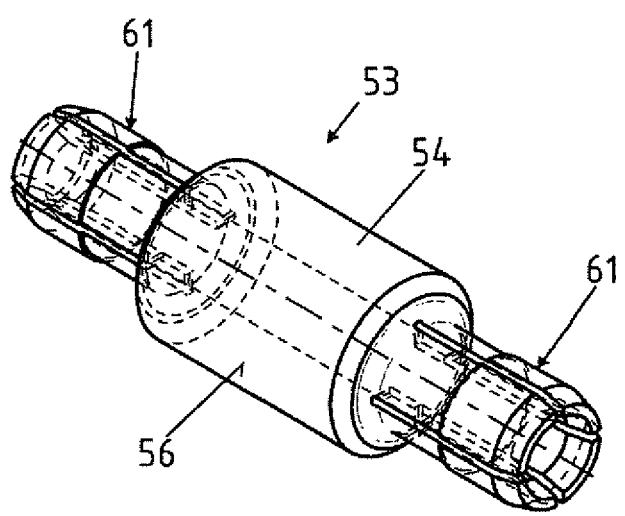

FIGS. 6a and b show a crosspiece 50 according to the invention by way of a perspective view as well as perspective partly sectional view. FIG. 6a shows the mirror-symmetrical configuration of the crosspiece 50, comprised of two bearing sleeves 51. One of the two bearing sleeves 51 is also depicted in FIG. 9a showing in broken lines the interior portion of the locking bolt 53. Formed on the end of the bearing sleeves 51 are chamfered shoulders 52, respectively, with the chamfered shoulders 52 according to FIG. 1a resting laterally against the link brackets 4, 5 in the locked position of the crosspiece 50 and protruding relative to an outer surface area 65 in radial direction. FIG. 6b shows the perspective view by way of a partial section, with the two bearing sleeves 51 again being shown with their chamfered shoulders 52. Disposed in the interior of the bearing sleeves 51 is a locking bolt 53, wherein the locking bolt 53 is also readily apparent in FIGS. 7b and 9b. The locking bolt 53 itself includes a centrally disposed centering cylinder 54 having an outer surface area 56 which bears form-fittingly in a respective centering cylinder receptacle 55 of the bearing sleeves 51. The centering cylinder receptacle 55 of the bearing sleeves 51 then transitions in direction toward the end of the bearing sleeves 51 into a spring journal receptacle 57, with a transition is formed with a rounded edge 58 so as to prevent tilting, when the locking bolt 53 and the bearing sleeves 51 are connected together.

Figure 7:
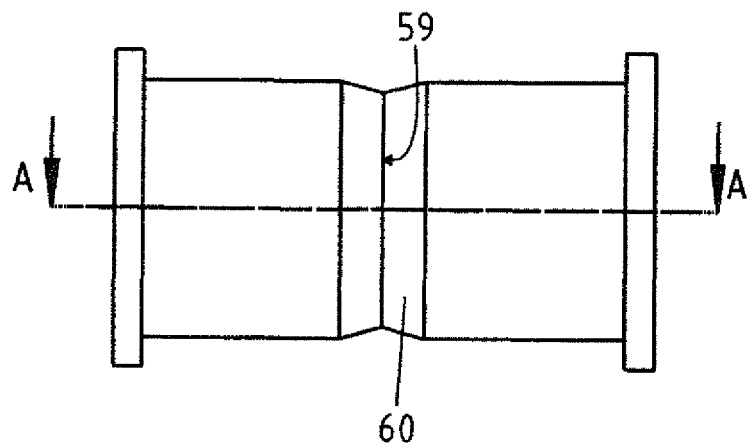
FIGS. 7a, b the crosspiece according to the invention by way of a side view and cross section view.
Figure 7:
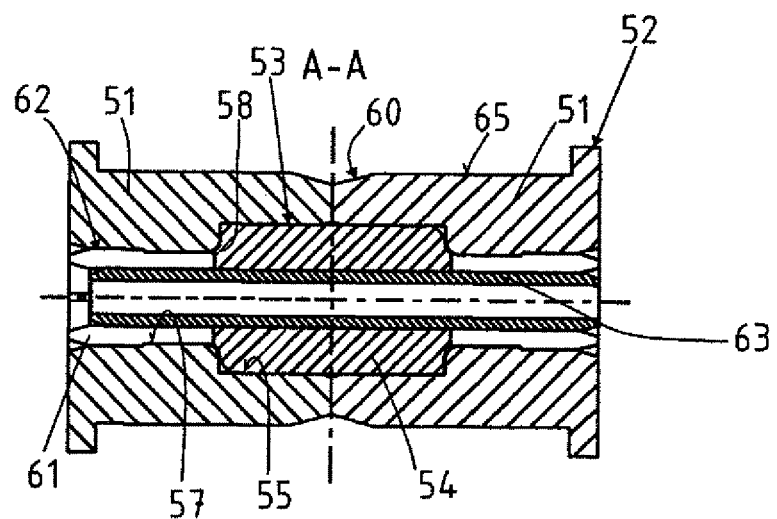

Also shown in FIG. 7a, the bearing sleeves 51, in an assembled state, include at their inner side 59 a flattened surface 60 so as to enable easy insertion into the link brackets 4, 5.

Figure 8:
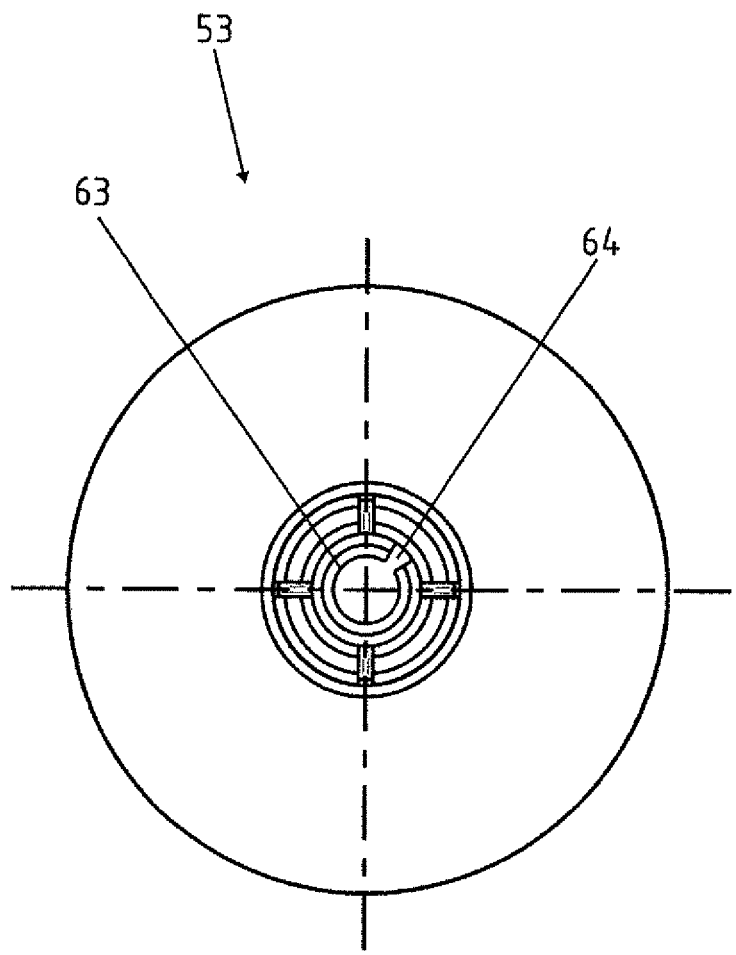
FIG. 8 the crosspiece according to the invention by way of an end view.

The spring journals 61 project beyond the bearing journal and, according to FIG. 7b, lock in the spring journal receptacle 57 from-fittingly via a detent nose 62. Since thus an inadvertent withdrawal, i.e. a compression of the detent noses 62, in radial direction is prevented, a clamping pin 63 is further inserted into the locking bolt 53, with the clamping pin 63 according to FIG. 8 being provided with a longitudinal slit 64 so that the latter is radially expandable or compressible. In accordance with the invention, readily apparent in particular in FIG. 7b, the clamping pin 63 is insertable into or extractable into the crosspiece 50 according to the invention from either side. The same is true for the locking bolt 53 itself. It can be likewise extracted from either side of the crosspiece 53 according to the invention with the respective bearing sleeve 51.

What is claimed is:

1. A chain connecting element, comprising:
   two link brackets having opposing limbs for connection of the link brackets to one another, and a crosspiece configured for transverse insertion between the limbs to lock the link brackets when interconnected, wherein the limb of one of the link brackets has a neck portion and in relation thereto a thickened journal, and the opposing limb of the other one of the link brackets having a complementing neck recess and a journal recess, said crosspiece constructed mirror-symmetrical and including an inner locking bolt having ends, each end having a spring journal, and two bearing sleeves in opposing relationship for form-fitting engagement in the link brackets; and a clamping pin configured for insertion into and extraction from the locking bolt from either side thereof and to form-fittingly secure the spring journals in the bearing sleeves.

2. The chain connecting element of claim 1, wherein the bearing sleeves have an outer surface area and an outer end face formed with a chamfered shoulder which projects out in radial direction in relation to the outer surface area, said chamfered shoulder abutting the link brackets in a form-fitting manner.

3. The chain connecting element of claim 2, wherein the chamfered shoulder is received in a recess of the link brackets such that an outer side of the chamfered shoulder ends flush with an outer side of the link brackets.

4. The chain connecting element of claim 1, wherein each of the bearing sleeves has an outer surface area which is flattened at an inner wall of the bearing sleeve.

5. The chain connecting element of claim 1, wherein the bearings sleeves have inner surfaces which in a locked position abut end-to-end in a form-fitting manner.

6. The chain connecting element of claim 1, wherein the locking bolt includes a central centering cylinder formed in one piece with the spring journals which are configured to project out from the centering cylinder.

7. The chain connecting element of claim 1, wherein the locking bolt is constructed hollow, said clamping pin being insertable or extractable from either side of the locking bolt.

8. The chain connecting element of claim 1, wherein each spring journal has at least two spring tongues having ends formed with a detent nose.

9. The chain connecting element of claim 8, wherein the detent nose has a flattened outer side.

10. The chain connecting element of claim 8, wherein the spring tongues have an inner diameter which increases toward an end of the spring tongues.

* * * * *